United States Patent Office 3,833,728
Patented Sept. 3, 1974

3,833,728
INDOLE DERIVATIVES IN THE TREATMENT OF SKELETAL MUSCLE FATIGABILITY
Nathan Norman Share and Cyril Stephen McFarlane, Montreal, Quebec, Canada, assignors to Merck Sharp & Dohme (I.A.) Corp., Rahway, N.J.
No Drawing. Original application Nov. 23, 1970, Ser. No. 92,299, now Patent No. 3,689,657. Divided and this application Mar. 24, 1972, Ser. No. 237,930
Int. Cl. A61k 27/00
U.S. Cl. 424—269
9 Claims

ABSTRACT OF THE DISCLOSURE

Skeletal muscle fatigability is treated by administration of a composition containing a skeletal muscle stimulant which is a derivative of indole-3-acetic acid or of indole-3-ylmethyltetrazole.

---

This is a division of application Ser. No. 92,299, filed Nov. 23, 1970, now U.S. Patent No. 3,689,657.

This invention is concerned with a novel method for producing muscle stimulation in animals which comprises the administration of derivatives of indole.

The agents found useful in this novel method of treatment can be illustrated by the following structural formula, (I).

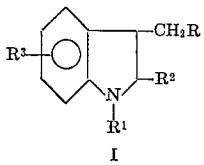

wherein R represents
(1) —COZ, wherein Z represents
   (a) hydroxyl,
   (b) lower alkoxy of from 1 to about 8 carbon atoms, either straight or branch chained and either unsubstituted or substituted with
      (i) di(lower alkyl) aminomethyl, wherein the lower alkyl groups have from 1 to about 3 carbon atoms, such as methyl, ethyl and propyl,
      (ii) hydroxy,
      (iii) phenyl, either unsubstituted or substituted with nitro, halo such as chloro, bromo or fluoro, or lower alkyl of 1 to about 3 carbon atoms,
      (iv) lower alkoxy of from 1 to about 3 carbon atoms,
   (c) phenoxy, either unsubstituted or substituted with nitro, halo such as fluoro, chloro or bromo, or lower alkyl of from 1 to about 3 carbon atoms,
(2) tetrazol-5-yl.
$R^1$ represents
(1) hydrogen,
(2) lower alkyl of 1 to about 3 carbons,
(3) lower alkenyl of from 3 to about 5 carbon atoms, such as allyl, butenyl and the like;
$R^2$ represents
(1) lower alkyl of 1 to about 8 carbon atoms, either straight or branch chained and either unsubstituted or substituted with
   (a) lower alkoxy of 1 to about 3 carbons,
   (b) lower alkylthio of 1 to about 3 carbons,
   (c) ω,ω,ω-trifluoro,
(2) lower alkylcarbonyl, wherein the lower alkyl group has from 1 to about 5 carbon atoms;

$R^3$ represents
(1) hydrogen,
(2) lower alkyl of 1 to about 3 carbon atoms, either unsubstituted or substituted with halo or lower alkoxy of 1 to about 3 carbon atoms,
(3) nitro,
(4) halo such as chloro, bromo or fluoro.

The active agents of the method of this invention have been found in standard laboratory animals to produce myotonic symptoms consisting of temporary rigid extension of the legs when the animal is disturbed. The overt appearance is readily distinguishable from convulsions caused by central stimulation. This stimulation of striated muscle is useful in the treatment of disease entities characterized by progressive fatigability of the muscles such as myasthenia gravis.

Present day therapy for myasthenia gravis generally involves a class of agents termed acetylcholinesterase inhibitors and/or skeletal muscle facilitators. These substances often exhibit side effects such as extreme salivation, involuntary defacation and urination, sweating, lacrimation, bradycardia and hypotension. They have a relatively low therapeutic index and are not always effective. The compounds of the novel method of this invention on the other hand operate through a mechanism of action different from that of the acetylcholinesterase inhibitors and fail to produce any of the adverse side-effects described above in experimental animals, and have a much higher therapeutic index. They have further been shown to facilitate the activity of acetylcholinesterase inhibitors and therefore may also be used in combination with them to reduce their toxicity.

Treatment with the active agents of this invention can be orally in the form of powders, granules, wafers, tablets, capsules or pills, or by injection intravenously, or intraperitoneally in suspension or in solution. Where Z is hydroxyl they can be administered as a pharmaceutically acceptable salt, such as an alkali metal salt, preferably the potassium or sodium salt. The dose is from 1 to about 50 mgs./kg./day either singly or on a multidose regimen depending on the severity of the disorder and the discretion of the physician.

These active muscle stimulant products wherein R is a carboxyl group can be prepared by the prior art multistep process outlined below:

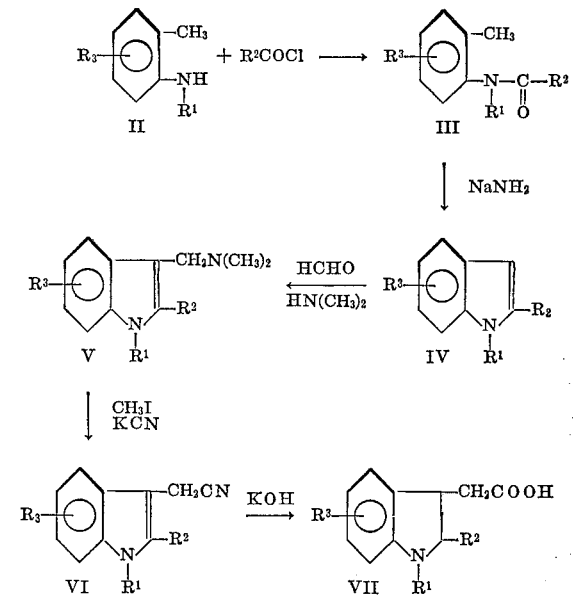

A detailed description of the synthesis of Compound VII wherein $R^2$ is butyl and $R^3$ is 5-methyl, is included in Example I below.

The preparation of ester derivatives of Compound VII are performed by standard chemical syntheses well known in the art, and a detailed procedure is included in the examples below.

The preparation of a compound wherein R is tetrazol-5-yl is described in Example 35.

EXAMPLE 1

2-Butyl-5-Methylindole-3-Acetic Acid

Step A: Preparation of N-(2,4-dimethylphenyl) pentanamide

A solution of 22.7 g. (0.188 mole) of pentanoyl chloride in 100 ml. tetrahydrofuran is added over 20 minutes to a stirred, ice-cooled solution of 121.2 g. (1 mole) 1-amino-2,4-dimethylbenzene. After standing for several hours at room temperature the solvent is removed by distillation in vacuo. The residue is taken up in ether and extracted with 12N HCl to remove excess 1-amino-2,4-dimethylbenzene. After washing to neutrality and drying over magnesium sulfate, the ether solution is concentrated to yield 25.1 g. of N-(2,4-dimethylphenyl)pentanamide, m.p. 114–115° C.

Step B: Preparation of 2-butyl-5-methylindole

To a stirred solution of 20.5 g. (0.1 mole) of N-(2,4-dimethylphenyl)pentanamide in 250 ml. diethylaniline under nitrogen, is added in portions, 20 g. (0.526 mole) of sodamide. The mixture is heated slowly to 220° C. and maintained at this temperature for 5 hours. The reaction mixture is cooled to about 50° C., and the excess sodamide carefully decomposed by the addition of 300 ml. of water. The organic phase is extracted into 300 ml. ether and washed with portions of cold 4N HCl and water, The ether solution is dried and concentrated to 20.2 g. of residual solid. Recrystallization from petroleum ether gives 2-butyl-5-methylindole, m.p. 73.5–75.5° C.

Step C: Preparation of 3-(dimethylaminomethyl)-2-butyl-5-methylindole

A solution of 6.087 g. (0.0325 mole) of 2-butyl-5-methylindole in 32.5 ml. dioxane is added dropwise to a stirred solution of 3.25 ml. of formaldehyde (25% aqueous), 7.15 ml. of dimethylamine (37% aqueous), 32.5 ml. of glacial acetic acid, and 32.5 ml. of dioxane at a temperature maintained below 0° C. After the addition is complete, the reaction mixture is allowed to warm to room temperature over a period of 18 hours. It is diluted with 300 ml. water and filtered to remove a small amount of gummy by-product. The filtrate is chilled in an ice-bath and made basic (pH 10–11) with 10N KOH. The precipitated product is filtered, washed with water and dried. Recrystallization from n-hexane gives 5.0 g. (63.3%) of 3 - dimethylaminomethyl)-2-butyl-5-methylindole, m.p. 108.5–110.5° C.

Step D: Preparation of 2-butyl-3-(cyanomethyl)-5-methylindole

A solution of 3.42 g. (0.014 mole) of 3-dimethylaminomethyl)-5-methyl-2-butylindole dissolved in 60 ml. dry ether is added dropwise with stirring to an ice-cooled solution of 19.5 ml. of iodomethane and stirred for 6 hours at 0° C. The precipitate is filtered, washed with ether and dried to yield 4.7 g. (87%) of the methiodide salt of 3-(dimethylaminomethyl)-5-methyl-2-butylindole.

Without further purification, the methiodide is added to a solution of 8.93 g. potassium cyanide in 68.3 ml. of water and maintained at 80° C. with stirring for 2 hours. After cooling, the reaction mixture is extracted with ether, the ether solution is washed with water, dried over magnesium sulfate and evaporated to a residual yellow oil, 2.9 g. (90%) of 2-butyl-3-(cyanomethyl)-5-methylindole.

Step E: Preparation of 2-butyl-5-methylindole-3-acetic acid

The nitrile 2.9 g. (0.0128 mole), is added to a solution of 11.53 g. (0.205 mole) potassium hydroxide in 39 ml. of water and 64 ml. ethanol and refluxed for 16 hours under a blanket of nitrogen. The reaction mixture is diluted with 500 ml. water, acidified to pH 2 with concentrated hydrochloric acid and extracted with ether. The ether extract is washed with water, dried over magnesium sulfate and evaporated to a crystalline residue, 3.1 g. (90%). Recrystallization from petroleum ether yields 2-butyl-5-methylindole-3-acetic acid, m.p. 106–110° C.

Employing the procedure of Example 1 but substituting for the pentanoyl chloride and 1-amino-2,4-dimethylbenzene utilized therein equivalent quantities of an acid chloride of formula $R^2COCl$ and a benzene derivative of structure

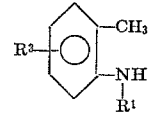

there are produced the substituted indoleacetic acids depicted in Table I.

TABLE I

| Ex. | $R^1$ | $R^2$ | $R^3$ | M.P. (° C.) |
|---|---|---|---|---|
| 2 | H | n-C$_6$H$_{13}$— | 5-CH$_3$ | Oil |
| 3 | H | —CH$_2$CH(CH$_3$)$_2$ | 5-CH$_3$ | 131.5–142 |
| 4 | H | n-C$_3$H$_7$— | 6-CH$_3$ | 127–131.5 |
| 5 | H | n-C$_3$H$_7$— | 5(or 6)-C$_2$H$_5$ | 113–115 |
| 6 | —CH$_3$ | n-C$_3$H$_7$— | 5-CH$_3$ | 133–134 |
| 7 | —CH$_2$—CH=CH$_2$ | n-C$_3$H$_7$— | 5-CH$_3$ | 120–123 |
| 8 | H | n-C$_3$H$_7$— | 5-CH$_3$ | 144–149 |
| 9 | H | n-C$_3$H$_7$— | H | 154–158 |
| 10 | H | n-C$_3$H$_7$— | 5-Cl | |
| 11 | —C$_2$H$_5$ | n-C$_3$H$_7$— | 5-F | |
| 12 | H | —(CH$_2$)$_3$OCH$_3$ | 5-CH$_3$ | |
| 13 | H | —CH$_2$CF$_3$ | 5-CF$_3$ | |
| 14 | H | —(CH$_2$)$_3$SCH$_3$ | 5-CH$_3$ | |
| 15 | —CH$_3$ | n-C$_3$H$_7$— | 5-CH$_2$OCH$_3$ | |

EXAMPLE 16

Methyl 5-methyl-2-propylindole-3-acetate 5-methyl-2-propylindole-3-acetic acid (2.776 g.) is added with stirring to a solution of acetylchloride (3 ml.) in anhydrous methanol (60 ml.) maintained at 0–7° C. and the resultant solution is held overnight at 0–7° C. The solution is concentrated to dryness and the residue is fractionally distilled. The distillate (b.p. 132–150°/0.3 mm. Hg) crystallizes spontaneously and is recrystallized from petroleum ether to yield 1.75 g. of methyl 5-methyl-2-propylindole-3-acetate, m.p. 75.5–78° C.

EXAMPLE 17

Octyl 5-methyl-2-propylindole-3-acetate 5-methyl-2-propylindole-3-acetic acid (3.45 g., 15 mmole) is stirred into 80 mls. of n-octyl alcohol and through this mixture is bubbled dry hydrogen chloride for 3 minutes. The mixture is stirred at ambient temperature for 18 hours. Excess solvent is removed under high vacuum at a temperature below 130° C. The oily residue is dissolved in ether, washed with water, dried over magnesium sulfate, treated with decolorizing charcoal, filtered and concentrated to dryness. The residue is recrystallized from a methanol-water mixture to give octyl 5-methyl-2-propyl-indole-3-acetate, m.p. 35–37° C.

Employing the procedure of Example 17 but substituting for the octanol and the 5-methyl-2-propylindole-3-acetic acid utilized therein equivalent amounts of an alcohol of formula ZH and a 1-R$^1$-2-R$^2$-5(or 6)-R$^3$-indole-3-acetic acid described in Table II, there are produced the Z 1-R$^1$-2-R$^2$-5(or 6)-R$^3$-indole-3-acetates, also described in Table II.

extract on concentration and cooling gives 2-propyl-5-nitroindole-3-acetic acid (4.32 g.). Evaporation of the chloroform mother liquors gives a powdery residue which on chromatography on a silica gel column, gives an additional 9 g. of the nitro compound, m.p. 195–200° C. (36.2%).

EXAMPLE 34

2-propionylindole-3-acetic acid

Indole-3-acetic acid (11.0 g.) and propionyl chloride (100 ml.) in diethyl ether (100 ml.) is added to finely powdered zinc chloride (7.0 g.) and the mixture refluxed with stirring for 1 hour. The reaction mixture is decomposed by the careful addition of water and the crude product which precipitates is filtered. Recrystallization from acetone-petroleum ether yields 4.5 g. (32%) of 2-propionylindole-3-acetic acid, m.p. 226–228° C.

EXAMPLE 35

5-(5-methyl-2-propylindole-3-ylmethyl)tetrazole

To a solution of 1.8 g. (0.0085 mole) of 3-cyanomethyl-5-methyl-2-propylindole in 20 ml. methyl Cellosolve is added 1.1 g. (0.017 mole) powdered sodium amide and

TABLE II

| Ex. | R$^1$ | R$^2$ | R$^3$ | Z | M.P. (° C.) |
|---|---|---|---|---|---|
| 18 | H | n-C$_3$H$_7$ | H | —OCH$_3$ | Liquid |
| 19 | H | n-C$_3$H$_7$ | 5-CH$_3$ |  | 74.5–76.5 |
| 20 | H | n-C$_3$H$_7$ | H | —OCH$_2$CH(OH)CH$_3$ | Liquid |
| 21 | H | n-C$_3$H$_7$ | 5-CH$_3$ | —OC$_2$H$_5$ | Liquid |
| 22 | H | n-C$_3$H$_7$ | 5-CH$_3$ |  | Liquid |
| 23 | H | n-C$_3$H$_7$ | H | Same as above | 62.5–64.0 |
| 24 | H | n-C$_3$H$_7$ | 5-CH$_3$ | —O(CH$_2$)$_2$N(CH$_3$)$_2$ | 67.5–69.5 |
| 25 | —CH$_3$ | n-C$_3$H$_7$ | 5-CH$_3$ | —OCH$_3$ | Liquid |
| 26 | H | n-C$_3$H$_7$ | 5-CH$_3$ | —OC$_2$H$_4$OCH$_3$ | |
| 27 | H | —(CH$_2$)$_3$OCH$_3$ | 5-CH$_3$ |  | |
| 28 | —CH$_2$—CH=CH$_2$ | n-C$_3$H$_7$ | 5-CH$_3$ |  | |
| 29 | —C$_2$H$_5$ | n-C$_3$H$_7$ | 5-F |  | |
| 30 | H | —CH$_2$CF$_3$ | 5-CF$_3$ |  | |
| 31 | H | —(CH$_2$)$_3$SCH$_3$ | 6-CH$_3$ |  | |
| 32 | —CH$_3$ | n-C$_3$H$_7$ | 5-CH$_2$OCH$_3$ |  | |

EXAMPLE 33

5-nitro-2-propylindole-3-acetic acid

A solution of sodium nitrate (11.76 g.) in concentrated sulfuric acid (300 ml.) is added dropwise with stirring to a solution of 2-propylindol-2-acetic acid (30 g.) in concentrated sulfuric acid maintained at 5° C. in an ice-bath. The solution is stirred for ½ hour and poured into ice-water. The yellow precipitate is filtered and washed with water. The solid is dissolved in ethyl acetate, dried, and the solvent evaporated and the gummy residue is extracted several times with chloroform. The chloroform 0.72 g. (0.017 mole) powdered lithium chloride and the suspension refluxed and stirred for 114 hours. The solvent is removed by distillation in vacuo and the residue taken up in ether and water and treated with 12N HCl to decompose azide salts. A stream of nitrogen is bubbled through the reaction mixture to remove hydrazoic acid. The crude product which precipitates is filtered and washed with water and ether. The product is purified by dissolving in dilute sodium hydroxide and precipitating with dilute hydrochloric acid to yield 0.5 g. of 5-(5-methyl-2-propylindole-3-yl-methyl)tetrazole, m.p. 183–184° C.

Employing the method of Example 35 but substituting for the 3 - cyanomethyl - 5-methyl-2-propylindole used therein, equivalent amounts of the 3-cyanomethyl-5-$R^3$-2-$R^2$-1-$R^1$-indoles described in Table III, there are produced the 5 - (5-$R^3$-2-$R^2$-1-$R^1$-indol-3-ylmethyl)tetrazoles also described in Table III.

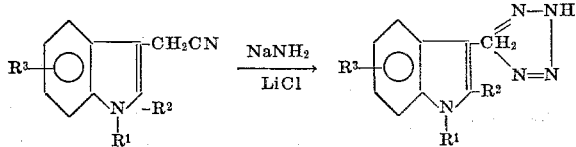

| Example | $R^1$ | $R^2$ | $R^3$ |
| --- | --- | --- | --- |
| 36 | H | n-$C_4H_9$ | 5-$CH_3$ |
| 37 | H | n-$C_6H_{13}$ | 5-$CH_3$ |
| 38 | H | n-$C_3H_7$ | H |
| 39 | H | —$CH_2CF_3$ | 5-$CF_3$ |
| 40 | —$CH_3$ | n-$C_3H_7$ | 5-$CH_2OCH_3$ |
| 41 | —$C_2H_5$ | n-$C_3H_7$ | 5-F |

The active agents of the method of this invention were found in standard laboratory animals to produce myotonic symptoms consisting of temporary rigid extension of the legs when the animal is disturbed.

The compounds were initially tested for skeletal muscle stimulant properties at doses of 32 mg./kg. intra-peritoneally (i.p.). Effective doses ($ED_{50}$) were then determined for active compounds by that route, and subsequently by intravenous (i.v.) and oral (p.o.) administration.

Although toxicities were not accurately determined in all cases, no lethality was observed during the $ED_{50}$ determinations.

The procedure used for i.p., i.v. and p.o. administrations was as follows:

Groups of male albino mice (Swiss strain, Canadian Breeding Laboratories), weighing 18–22 grams were employed. Compounds were suspended in 1% Methocel (methyl cellulose, 400 cps., 65 Hg) with the aid of an homogenizer and administered, i.v., i.p. or p.o. in a volume of 0.2 ml./20 g. of body weight.

The results obtained following the above procedure upon the administration of the skeletal muscle stimulant agents of this invention indicate that the $ED_{50}$ by intravenous, intraperitoneal, and oral administration are in the ranges 0.4–71, 0.7–30, 0.5–14 mg./kg. respectively.

It is to be noted that in so far as the active agents of this invention are concerned, no gross toxic symptoms were observed in any of the animals at the dose levels employed.

The amount of muscle stimulant agent to be employed in the method of this invention will depend upon the age, condition, weight and other factors relevant to the animal to be treated and necessarily needs to be individualized by the physician or veterinarian for each patient. A suitable unit dosage form for oral administration is described in the following example:

EXAMPLE 36

Capsule containing 25 mgs. of active ingredient

| Ingredient: | mgs./capsule |
| --- | --- |
| 5-methyl-2-propylindole-3-acetic acid | 25 |
| Corn starch U.S.P. | 10 |
| Lactose U.S.P. | 130 |

25 g. of 5-methyl-2-propylindole-3-acetic acid is intimately blended with 10 g. corn starch U.S.P. The mixture is filled into No. 4 gelatin capsules using conventional methods known in the art to produce oral dosage units each containing 25 mg. 5-methyl-2-propylindole-3-acetic acid.

EXAMPLE 37

Injectable preparation containing 10 mg. of active ingredient

The sodium salt of 5 - methyl-2-propylindole-3-acetic acid is dissolved in pyrogen free water at a concentration of 10 mg./ml. and the resulting solution is dispensed into 1 cc. pharmaceutical vials.

The soluble salts can be formed from any pharmaceutically acceptable materials such as sodium, potassium, ammonia, amines, and the like. The active ingredients can also be administered in aqueous suspension as the procaine salt. In addition the active ingredients can be administered in aqueous suspension as the free acids or as the esters described herein.

What is claimed is:

1. A method of treatment of skeletal muscle fatigability which comprises the administration to an affected animal of an effective amount of a skeletal muscle stimulant having the structural formula

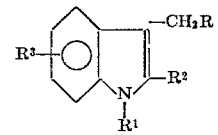

wherein
R is tetrazol-5-yl;
$R^1$ is a member selected from the group consisting of
(1) hydrogen,
(2) lower alkyl, and
(3) lower alkenyl;
$R^2$ is a member selected from the group consisting of
(1) lower alkyl,
(2) lower alkoxy-lower alkyl,
(3) lower alkylthio-lower alkyl,
(4) $\omega,\omega,\omega$-trifluorolower alkyl, and
(5) lower alkylcarbonyl;
$R^3$ is a member selected from the group consisting of
(1) hydrogen,
(2) lower alkyl,
(3) halo-lower alkyl,
(4) lower alkoxy-lower alkyl,
(5) nitro, and
(6) halo.

2. The method of Claim 1 wherein the muscle stimulant has the structural formula

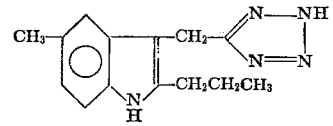

3. A composition for the treatment of skeletal muscle fatigability which comprises an effective amount of a skeletal muscle stimulant having the structural formula

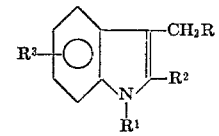

wherein
R is tetrazol-5-yl;
$R^1$ is a member selected from the group consisting of
(1) hydrogen,
(2) lower alkyl, and
(3) lower alkenyl;
$R^2$ is a member selected from the group consisting of
(1) lower alkyl,
(2) lower alkoxy-lower alkyl,
(3) lower alkylthio-lower alkyl,
(4) $\omega,\omega,\omega$-trifluorolower alkyl, and
(5) lower alkylcarbonyl;
$R^3$ is a member selected from the group consisting of
(1) hydrogen,
(2) lower alkyl,
(3) halo-lower alkyl,
(4) lower alkoxy-lower alkyl, (5) nitro, and
(6) halo;
and a pharmaceutically acceptable carrier.

4. The composition of Claim 3 wherein the carrier is orally pharmaceutically acceptable.

5. The composition of Claim 3 wherein the carrier is intraveneously pharmaceutically acceptable.

6. The composition of Claim 3 wherein the carrier is intraperitoneally acceptable.

7. The composition of Claim 3, wherein the muscle stimulant has structural formula

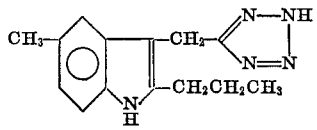

8. The composition of Claim 4 wherein the muscle stimulant has structural formula

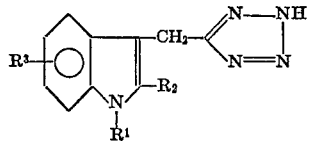

wherein $R^1$, $R^2$ and $R^3$ are as defined in Claim 4.

9. The composition of Claim 4 wherein the muscle stimulant has structural formula

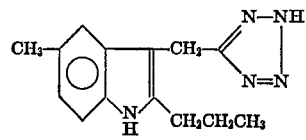

No references cited.

STANLEY J. FRIEDMAN, Primary Examiner